(12) United States Patent
Mun et al.

(10) Patent No.: US 8,780,026 B2
(45) Date of Patent: Jul. 15, 2014

(54) TRANSFLECTIVE DISPLAY APPARATUS

(75) Inventors: Yong-kweun Mun, Yongin-si (KR);
Hong-seok Lee, Seongnam-si (KR);
Yoon-sun Choi, Incheon (KR); Hoon Song, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 798 days.

(21) Appl. No.: 12/656,836

(22) Filed: Feb. 17, 2010

(65) Prior Publication Data

US 2010/0231501 A1    Sep. 16, 2010

(30) Foreign Application Priority Data

Mar. 13, 2009   (KR) .................. 10-2009-0021862

(51) Int. Cl.
*G09G 3/36* (2006.01)
*G02F 1/1335* (2006.01)

(52) U.S. Cl.
CPC ........ *G02F 1/133555* (2013.01); *G02B 6/0051* (2013.01); *G02B 6/0055* (2013.01); *G02F 1/133514* (2013.01); *G02F 1/133605* (2013.01)
USPC .......................................................... 345/87

(58) Field of Classification Search
None
See application file for complete search history.

(56) References Cited

U.S. PATENT DOCUMENTS

| | | | |
|---|---|---|---|
| 5,956,107 A * | 9/1999 | Hashimoto et al. | 349/64 |
| 5,971,559 A * | 10/1999 | Ishikawa et al. | 362/625 |
| 6,425,673 B1 * | 7/2002 | Suga et al. | 362/613 |
| 8,507,926 B2 * | 8/2013 | Weng et al. | 257/88 |
| 2001/0048495 A1 * | 12/2001 | Yamaguchi et al. | 349/113 |
| 2001/0050736 A1 * | 12/2001 | Lee et al. | 349/65 |
| 2004/0041783 A1 * | 3/2004 | Lee et al. | 345/102 |
| 2004/0100597 A1 * | 5/2004 | Fukuda et al. | 349/112 |
| 2004/0183968 A1 * | 9/2004 | Hosaka | 349/114 |
| 2004/0263727 A1 * | 12/2004 | Noguchi | 349/113 |
| 2006/0092663 A1 * | 5/2006 | Noh et al. | 362/608 |
| 2006/0104088 A1 * | 5/2006 | Gon et al. | 362/607 |
| 2006/0274074 A1 * | 12/2006 | Miles | 345/540 |
| 2006/0290253 A1 * | 12/2006 | Yeo et al. | 313/116 |
| 2007/0242197 A1 * | 10/2007 | Watson et al. | 349/114 |

(Continued)

FOREIGN PATENT DOCUMENTS

| | | | | |
|---|---|---|---|---|
| JP | 2006-227408 A | 8/2006 | | |
| KR | 2001-0046581 | 6/2001 | | |
| KR | 2003-0004062 | 1/2003 | | |
| WO | WO2007/034827 | * | 3/2007 | ........ G02F 1/133357 |

*Primary Examiner* — Amare Mengistu
*Assistant Examiner* — Antonio Xavier
(74) *Attorney, Agent, or Firm* — Harness, Dickey & Pierce, P.L.C.

(57) ABSTRACT

Provided is a transflective display apparatus including a light source, a light guide plate guiding light from the light source or incident external light toward the inside, emitting the light or the incident external light to a light emitting surface of the light guide plate, and including a diffusion reflective member formed on the light emitting surface, a color reflective member disposed in a lower portion of the light guide plate and including a plurality of arrayed color regions for reflecting light of a color, a light modulation member disposed in an upper portion of the light guide plate, modulating light, and forming an image, including a plurality of pixel regions corresponding to the plurality of color regions, respectively, each of the plurality of pixel regions including an effective region and an ineffective region, wherein the diffusion reflective member is disposed to face the ineffective region.

17 Claims, 5 Drawing Sheets

(56) References Cited

U.S. PATENT DOCUMENTS

| | | | |
|---|---|---|---|
| 2007/0268443 A1* | 11/2007 | Tanno | 349/149 |
| 2008/0211989 A1* | 9/2008 | Park | 349/64 |
| 2008/0211999 A1* | 9/2008 | Gu et al. | 349/106 |
| 2009/0021675 A1* | 1/2009 | Kishioka et al. | 349/106 |
| 2009/0190068 A1* | 7/2009 | Kawamura | 349/65 |
| 2009/0230415 A1* | 9/2009 | Ide et al. | 257/98 |
| 2010/0053495 A1* | 3/2010 | Cadio et al. | 349/61 |
| 2010/0208169 A1* | 8/2010 | Mun et al. | 349/65 |

* cited by examiner

TRANSFLECTIVE DISPLAY APPARATUS

CROSS-REFERENCE TO RELATED APPLICATION

This application claims priority under 35 U.S.C. §119 to Korean Patent Application No. 10-2009-0021862, filed on Mar. 13, 2009, in the Korean Intellectual Property Office (KIPO), the entire contents of which are herein incorporated by reference.

BACKGROUND

1. Field

Example embodiments relate to a display apparatus, and more particularly, to a transflective display apparatus.

2. Description of the Related Art

Mobile devices, for example, mobile phones, personal digital assistants (PDAs), portable multimedia players (PMPs), and digital multimedia broadcasting (DMB) devices have become widely used. These mobile devices have caused changes in lifestyles in view of their amount of use, application fields, and diverse contents. Mobile device displays have expanded to allow the display of web documents and video from a relatively simple information type display, for example, the display of sound and text.

In addition to displays of mobile devices, public information displays (PIDs) are leading a main outdoor billboard market owing to an emerging tendency toward video outdoor billboards instead of text based outdoor billboards. Outdoor visibility is a performance index for PIDs.

Transmittive display apparatuses or self-emission type display apparatuses with illumination of high luminance may be used to display a clear image in the bright outdoors. However, these display type apparatuses consume a relatively large amount of energy. Research into reflective type display apparatuses for displaying an image by using a peripheral light without additional energy consumption has been conducted, but the reflective type display apparatuses are inferior to the transmittive display apparatuses or self-emission type display apparatuses in terms of brightness and/or image quality.

Research into a transflective liquid crystal display (LCD) which is a combination of a reflective display device and a transmittive display device, has been actively conducted. In the transflective LCD, an image is formed using light from a backlight unit and/or an external light. Thus, when the transflective LCD is used in a bright environment with solar light, display visibility may be secured and power consumption may be easily reduced. However, in this case, liquid crystal cells are divided into two regions, for example, a reflective region and a transmittive region, so that a manufacturing process of the transflective LCD is complex and incident light is divided, thereby causing a decline in luminance.

SUMMARY

Example embodiments include a display apparatus by which luminance and outdoor visibility may be secured and power consumption is relatively low.

Additional aspects will be set forth in part in the description which follows and, in part, will be apparent from the description, or may be learned by practice of example embodiments.

In accordance with example embodiments, a display apparatus may include a light source, a light guide plate, a diffusion reflective member, a color reflective member, and a light modulation member. The light source may be configured to emit backlight. The light guide plate may be configured to guide at least one of the backlight from the light source and external light between an upper surface of the light guide plate and a lower surface of the light guide plate. The upper surface of the light guide plate light may include a light emitting surface configured to emit at least one of the backlight from the light source and the external light. The diffusion reflective member may be on the upper surface of the light guide plate. The color reflective member may be below the lower surface of the light guide plate and may include a plurality of arrayed color regions configured to receive at least one of the backlight and the external light and reflect at least one of the backlight and the external light as colored light to the light guide plate. The light modulation member may be above the upper surface of the light guide plate and the light modulation member may include a plurality of pixel regions corresponding to the plurality of arrayed color regions. Each of the plurality of pixel regions may include an effective region and an ineffective region. The light modulation member may be configured to modulate the colored light to form an image. In accordance with example embodiments the diffusion reflective member faces the ineffective region.

According example embodiments, a display apparatus may include a light source, a light guide plate, a color reflective member, and a light modulation member. In accordance with example embodiments, the light source may emit a backlight. In accordance with example embodiments, the light guide plate may be configured to guide the backlight from the light source within the light guide plate. In accordance with example embodiments, the light guide plate may be further configured to guide incident external light within the light guide plate. In accordance with example embodiments the light guide plate may include a light emitting surface configured to emit light. In accordance with example embodiments, the display apparatus may include a diffusion reflective member formed on the light emitting surface. In accordance with example embodiments, the color reflective member may be disposed in a lower portion of the light guide plate and may include a plurality of arrayed color regions for reflecting light of a color. In accordance with example embodiments, the light modulation member may be disposed in an upper portion of the light guide plate and may modulate light from the light emitting surface of the light guide plate to form an image. In accordance with example embodiments, the light modulation member may include a plurality of pixel regions corresponding to the plurality of color regions, respectively, so that each of the plurality of pixel regions includes an effective region and an ineffective region, wherein the diffusion reflective member is disposed to face the ineffective region.

In accordance with example embodiments, an area of the diffusion reflective member facing the ineffective region may be smaller than an area of the ineffective region.

In accordance with example embodiments, the area of the diffusion reflective member facing the ineffective region may vary as the diffusion reflective member gets farther from the light source, for example, and may increase as the diffusion reflective member gets farther from the light source.

In accordance with example embodiments, a density of the diffusion reflective member may vary according to a distance between the diffusion reflective member and the light source, for example, and increase as the diffusion reflective member gets farther from the light source.

In accordance with example embodiments, the diffusion reflective member may be formed by coating a scattering material on the light emitting surface.

In accordance with example embodiments, the diffusion reflective member may be formed of a scattering material including a florescent material.

In accordance with example embodiments, the diffusion reflective member may include an engraved or embossed scattering pattern on the light emitting surface and a reflective film coated on the scattering pattern of the light emitting surface In accordance with example embodiments, the color reflective member may be a reflective color filter, and for example, be a photonic crystal color filter.

In accordance with example embodiments, the reflective color filter may include a transmittive color filter and the reflective film.

In accordance with example embodiments, each color region of the reflective color filter facing the light guide plate may be concave toward the light guide plate.

In accordance with example embodiments, the light source may be disposed in one side lower portion of the light guide plate, and wherein a diffractive optical member is disposed between the light source and the light guide plate.

BRIEF DESCRIPTION OF THE DRAWINGS

Example embodiments will be more clearly understood from the following detailed description taken in conjunction with the accompanying drawings.

FIG. 1 is a cross-sectional diagram schematically illustrating a display apparatus according to example embodiments;

FIG. 2 illustrates a structure of the display apparatus of FIG. 1 in which a diffusion reflective member of a light guide plate corresponds to an ineffective region of a pixel region;

FIG. 3 is a cross-sectional diagram schematically illustrating a display apparatus according to example embodiments;

FIG. 4 is a cross-sectional diagram schematically illustrating a display apparatus according to example embodiments;

FIG. 5 is a cross-sectional diagram schematically illustrating a display apparatus according to example embodiments;

FIG. 6 is a cross-sectional diagram schematically illustrating a display apparatus according to example embodiments;

FIG. 7 is a cross-sectional diagram schematically illustrating a display apparatus according to another example embodiments; and FIG. 8 is a cross-sectional diagram schematically illustrating a display apparatus according to example embodiments.

DETAILED DESCRIPTION

Figure 1:
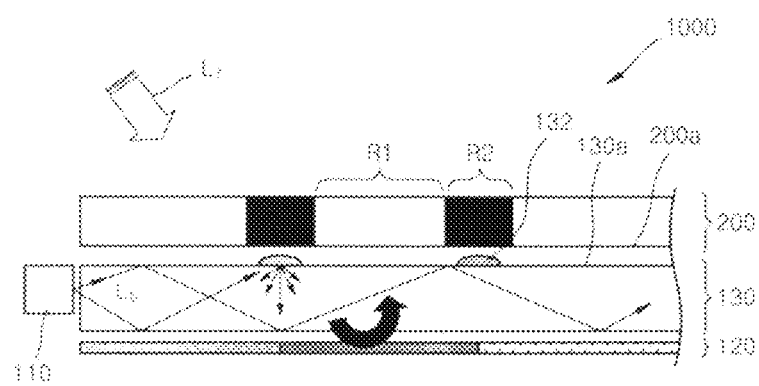
FIGS. 1-8 represent non-limiting, example embodiments as described herein.

Example embodiments will now be described more fully with reference to the accompanying drawings, in which example embodiments are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on", "connected to", or "coupled to" another element or layer, it can be directly on, connected to, or coupled to the other element or layer or intervening elements or layers that may be present. In contrast, when an element is referred to as being "directly on", "directly connected to", or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. Thus, a first element, component, region, layer, or section discussed below could be termed a second element, component, region, layer, or section without departing from the teachings of example embodiments.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configuration formed on the basis of manufacturing processes. Therefore, regions exemplified in figures have schematic properties and shapes of regions shown in figures exemplify specific shapes or regions of elements, and do not limit example embodiments.

Reference will now be made in detail to embodiments, examples of which are illustrated in the accompanying drawings, wherein like reference numerals refer to like elements throughout, and the sizes and thicknesses of layers and areas are exaggerated for clarity. In this regard, the present embodiments may have different forms and should not be construed as being limited to the descriptions set forth herein. Accordingly, the embodiments are merely described below, by referring to the figures, to explain aspects of the present description.

Figure 2:
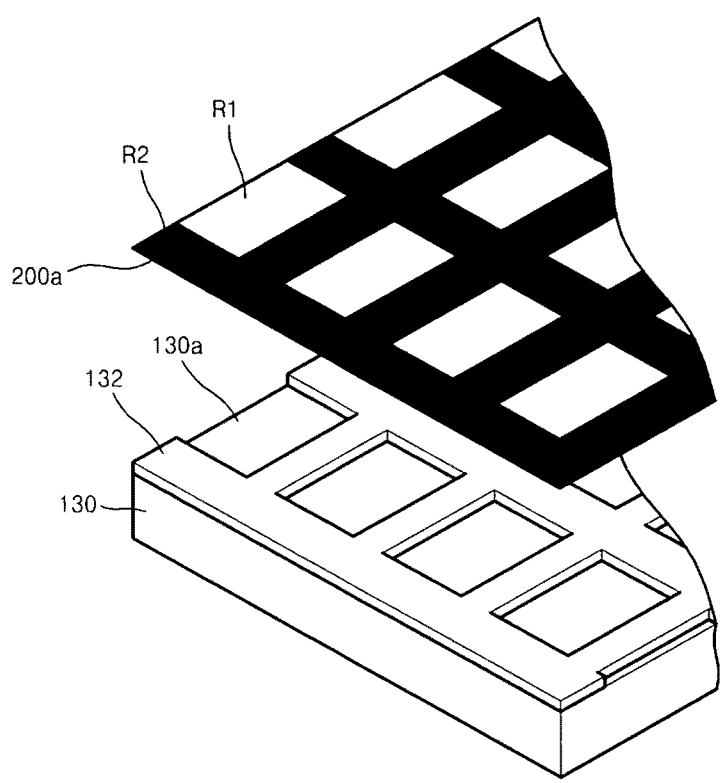

FIG. 1 is a cross-sectional diagram schematically illustrating a display apparatus 1000 according to example embodiments. FIG. 2 illustrates a structure of the display apparatus 1000 in which a diffusion reflective member 132 of a light guide plate 130 corresponds to an ineffective region R2.

Referring to FIG. 1, the example display apparatus 1000 includes a light source 110, the light guide plate 130, a color reflective member 120, and a light modulation member 200.

The light source 110 may be disposed at one side of the all-in-one type light guide plate 130. A point source, for example, a light emitting diode (LED), or a line source, for example, a cold cathode fluorescent lamp (CCFL) may be used as the light source 110. In addition, a plurality of point sources may be used or members for converting a point source into a line source may be used along with the point sources.

The light guide plate 130 may be configured to guide and emit light. For example, the light guide plate 130 may be configured to: 1) guide the backlight Lb incident from the light source 110 or external light Lf incident from a front side of the display apparatus 1000 inside the light guide plate 130; and 2) emit the guided light through a light emitting surface 130*a*. The diffusion reflective member 132 may be disposed on the light emitting surface 130*a*. The light guide plate 130 may be formed of a relatively transparent material and may be formed of, for example, polydimethylsiloxane, which may be relatively transparent and relatively flexible. The diffusion reflective member 132 may be formed by coating a scattering material on the light emitting surface 130*a*. For example, the diffusion reflective member 132 may be formed by coating a scattering material on the light emitting surface 130*a* through printing. The diffusion reflective member 132 will be described in more detail with reference to FIG. 2 later.

The color reflective member 120 may include a plurality of color regions for reflecting light of a color and the plurality of color regions may be organized in the form of an array. In accordance with example embodiments, the color reflective member 120 may be disposed near or in a lower portion of the light guide plate 130. The color reflective member 120 may have, for example, a structure in which single color filters of red, green, and blue corresponding to each pixel are arranged. A reflective color filter may be used as the color reflective member 120. For example, the reflective color filter may be formed by regularly arranging red, green, and blue dyes on a mirror surface. Also, a photonic crystal color filter may be used as the reflective color filter. The photonic crystal color filter may use photonic crystal having a regular arrangement structure of a refractive index in order to reflect light of a wavelength band.

The light modulation member 200 may modulate incident light and form an image, and may include a plurality of pixel regions corresponding to the plurality of color regions, respectively, of the color reflective member 120. A variety of types of display panels that are known to one of ordinary skill in the art may be used as the light modulation member 200. For example, the display panel may be a liquid crystal panel, a polymer dispersed liquid crystal (PDLC) panel, an electro-chromic display panel, an electro-wetting display panel, an electrophoretic display panel, and a micro electro mechanical system (MEMS) shutter. However, because the color reflective member 120 may be disposed in or near the lower portion of the light guide plate 130, the color filter may not be included in the display panel.

Each of the pixel regions included in the light modulation member 200 may be generally divided into an effective region R1 and the ineffective region R2. The effective region R1 is an open area that is substantially dedicated to forming an image. The ineffective region R2 is a dead zone. The effective region R1 and the ineffective region R2 are identified by devices, for example, necessary for driving each pixel. For example, the dead zone corresponding to the ineffective region R2 is formed by a thin film transistor (TFT) or a wire structure or a black matrix structure between pixels.

The diffusion reflective member 132 of the light guide plate 130 may be disposed to face the ineffective region R2 in order to maintain a relatively transparent property of the light guide plate 130. The display apparatus 1000 may use the backlight Lb, and the external light Lf incident from the front side of the display apparatus 1000 to form an image. In example embodiments, the light guide plate 130 may have transparency to allow the backlight Lb, and the external light Lf incident from both directions to pass therethrough. In order to emit the incident backlight Lb, and the external light Lf to the light emitting surface 130*a*, the diffusion reflective member 132 may diffuse and reflect the backlight Lb and the external light Lf in various directions so that the backlight Lb and the external light Lf that reach the light emitting surface 130*a* are not reflected but are emitted. Furthermore, because the diffusion reflective member 132 is disposed to face the ineffective region R2, the diffusion reflective member 132 may not prevent or retard the external light Lf from being incident through the light guide plate 130, thus allowing the light guide plate 130 to substantially maintain a transparency function.

Referring to FIG. 2, the diffusion reflective member 132 may be disposed to face the ineffective region R2. An area of the diffusion reflective member 132 facing the ineffective area R2 may be equal to or smaller than the area of the ineffective region R2. Although the diffusion reflective member 132 may be disposed to correspond to the ineffective area R2 as illustrated in FIG. 2, if occasion demands, for example, based on uniformity of the light emitted from the light emitting surface 130*a*, the diffusion reflective member 132 may not be disposed in a portion of the light emitting surface 130*a* corresponding to the ineffective area R2. Likewise, although the diffusion reflective member 132 may have a uniform size or form irrespective of the location thereof as illustrated in FIG. 2, example embodiments are not limited thereto and the size and form of the diffusion reflective member 132 may be adjusted based on the uniformity of the light in the light emitting surface 130*a*. Furthermore, although the form or size of the ineffective region R2 illustrated in FIG. 2 is not limited thereto, the form of the ineffective region R2 may specifically vary according to the type of display panel.

An example operation of forming an image in the display apparatus 1000 having the above described structure will now be described.

The backlight Lb from the light source 110 may be incident from one side surface of the light guide plate 130 and may be reflected from the light emitting surface 130*a* of the light guide plate 130 or from the lower surface of the light guide plate 130 facing the light emitting surface 130*a*. As shown in FIG. 1, the backlight Lb may reach the diffusion reflective member 132 which may diffuse and reflect the backlight Lb in various directions. The diffused and reflected backlight Lb may be incident on the lower surface of the light guide plate 130 at an angle smaller than a reflective threshold angle. Accordingly, the diffused and reflected backlight Lb may pass through the lower surface of the light guide plate 130 and onto the color reflective member 120. The color reflective member 120 may reflect the diffused and reflected backlight Lb toward the light guide plate 130. Because the color reflective member 120 includes the color regions, light reflected from the color regions may have a corresponding color. The color light that is reflected in the color reflective member 120 and is incident from the lower surface of the light guide plate 130 may be incident onto the light emitting surface 130*a* of the light guide plate 130 at the angle smaller than the reflective threshold angle and may be emitted from the light emitting surface 130*a*. The light, which may be diffused and reflected by the diffusion reflective member 132, may be incident onto the lower surface of the light guide plate 130 at the angle greater than the reflective threshold angle. In this case, the light may be reflected within the light guide plate 130. The reflected light may meet the diffusion reflective member 132 which may reflect the light towards the lower surface of the light guide plate 130 at an angle smaller than the reflective threshold angle. Accordingly, the light may pass through the lower surface of the light guide plate 130 and may be reflected by the color reflective member 120, and may be emitted from the light emitting surface 130*a* as a colored light. The light emitted from the light emitting surface 130*a* may be incident onto the light modulation member 200. Each pixel of the light modulation member 200 may be driven on/off according to image information and the incident light may be transmitted or blocked. A method of driving each pixel on/off varies according to the type of display panel selected as the light modulation member 200 and may be a method known to one of ordinary skill in the art.

The external light Lf incident from the front side of the display apparatus 1000 may be incident onto the light modulation member 200. Each pixel of the light modulation member 200 may be driven on/off according to image information and may allow the incident external light Lf to be transmitted or blocked. Likewise, a method of driving each pixel on/off varies according to the type of display panel selected as the light modulation member 200. The external light Lf may be incident onto the light guide plate 130 through a pixel that is driven in an on state in which light is transmitted. When the external light Lf is incident onto the light guide plate 130, there is no problem in the diffusion reflective member 132 formed in or on the light guide plate 130. Since the diffusion reflective member 132 may be disposed to face the ineffective region R2 of the light modulation member 200, the diffusion reflective member 132 may not prevent or retard the external light Lf from being incident onto the light guide plate 130. The light that is incident onto the lower surface of the light guide plate 130 at an angle smaller than a reflective threshold angle, from among the incident external light Lf, may pass through the lower surface of the light guide plate 130 and onto the color reflective member 120, and is reflected from the color reflective member 120 to have a corresponding color. The color light incident through the lower surface of the light guide plate 130 may be incident onto the light emitting surface 130a of the light guide plate 130 at an angle smaller than a reflective threshold angle, and may be emitted from the light emitting surface 130a. The light, which is incident onto the lower surface of the light guide plate 130 at an angle greater than the reflective threshold angle may be reflected. This reflected light from among the external light Lf incident onto the light guide plate 130, may be diffused and reflected in the diffusion reflective member 132 while moving toward the inside of the light guide plate 130. This light may pass through the lower surface of the light guide plate 130 and may be reflected by the color reflective member 120, and emitted from the light emitting surface 130a as a color light. The light emitted from the light emitting surface 130a may be transmitted through a pixel driven in an image on state.

The backlight Lb and the external light Lf may be contributed as light for forming an image. That is, one of the backlight Lb and the external light Lf or both of them may be used as light for forming an image, thereby realizing relatively low power consumption and relatively good visibility display.

Figure 3:
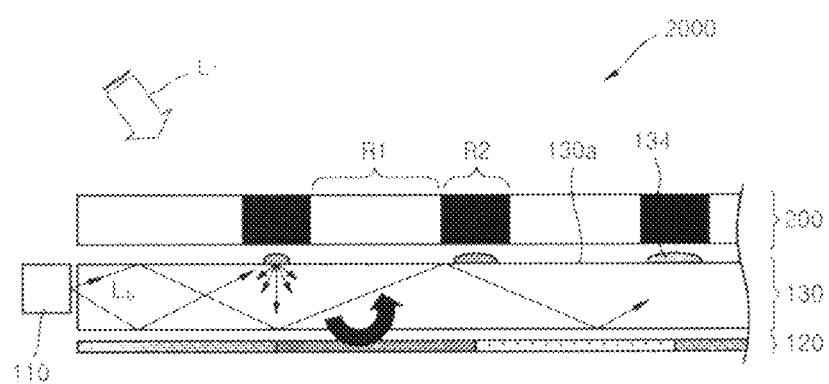

FIG. 3 is a cross-sectional diagram schematically illustrating a display apparatus 2000 according to example embodiments. Referring to FIG. 3, the example display apparatus 2000 includes the light source 110, the light guide plate 130, the color reflective member 120, and the light modulation member 200. A diffusion reflective member 134 may be disposed in the light emitting surface 130a of the light guide plate 130 and may face the ineffective region R2 of the light modulation member 200. An area of the diffusion reflective member 134 facing the ineffective region R2 may not be uniform and may increase as the diffusion reflective member 134 gets farther from the light source 110, which is different from the example display apparatus 1000 described with reference to FIG. 1. Such a structure may brighten the light emitted from the light emitting surface 130a.

As a modification of the example display apparatus described with reference to FIG. 3, although not shown, a density of the diffusion reflective member 134, e.g. a ratio between a region occupied by the diffusion reflective member 134 and each pixel region, may vary according to a distance between the diffusion reflective member 134 and the light source 110. For example, the diffusion reflective member 134 may not be formed in all regions on the light emitting surface 130a facing the ineffective region R2 and may not be formed in a location facing the ineffective region R2. In this regard, a density of the diffusion reflective member 134 may vary according to the distance between the diffusion reflective member 134 and the light source 110. For example, the density of the diffusion reflective member 134 may increase as the diffusion reflective member 134 gets farther from the light source 110.

Figure 4:
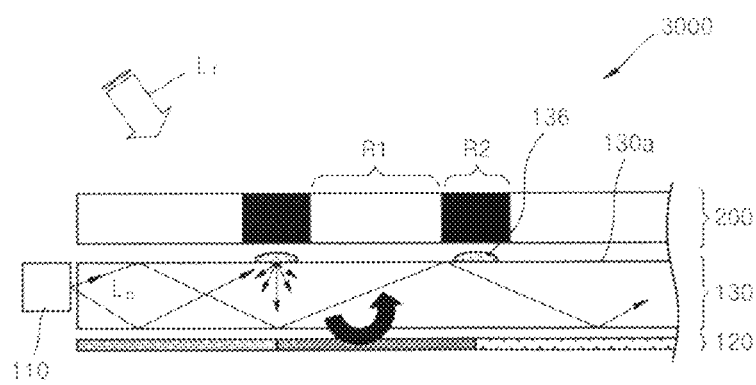

FIG. 4 is a cross-sectional diagram schematically illustrating a display apparatus 3000 according to example embodiments. Referring to FIG. 4, the example display apparatus 3000 includes the light source 110, the light guide plate 130, the color reflective member 120, and the light modulation member 200. A diffusion reflective member 136 is disposed on the light emitting surface 130a of the light guide plate 130 and faces the ineffective region R2 of the light modulation member 200. The diffusion reflective member 136 may be formed of a mixture of a scattering material and a fluorescent material in example embodiments, which is different from the embodiment described with reference to FIG. 1. The fluorescent material of the diffusion reflective member 136 may be excited by light energy emitted from the light source 110 and may emit light having a wavelength band longer than that of the light emitted from the light source 110. The wavelength band of the light emitted from the light source 110 may be determined according to the type of fluorescent material. For example, the light source 110 may be a blue light emitting diode or an ultraviolet ray light emitting diode. In this case, red, green, and blue light may be emitted from the fluorescent material by light energy emitted from the blue light emitting diode or the ultraviolet ray light emitting diode. Also, the light source 110 may emit white light. In this case, a non-visible region component that is partially included in a white light component may be removed.

Figure 5:
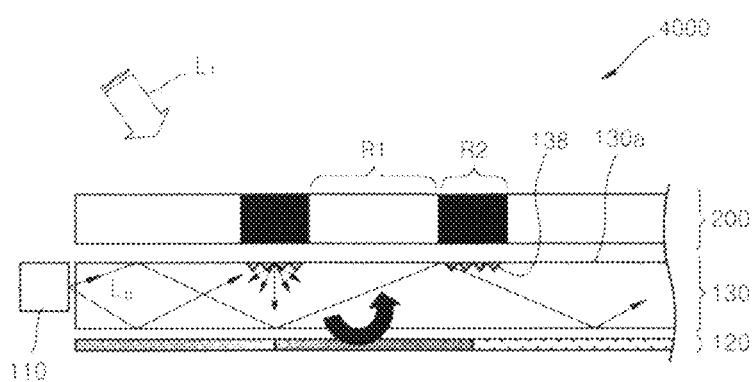

FIG. 5 is a cross-sectional diagram schematically illustrating a display apparatus 4000 according to example embodiments. Referring to FIG. 5, the display apparatus 4000 includes the light source 110, the light guide plate 130, the color reflective member 120, and the light modulation member 200. A diffusion reflective member 138 is disposed on the light emitting surface 130a of the light guide plate 130 and faces the ineffective region R2 of the light modulation member 200. The example display apparatus 4000 illustrated in FIG. 5 is different from the previous described example display apparatuses in terms of the form of the diffusion reflective member 138. The diffusion reflective member 138 illustrated in FIG. 5 is formed by engraving the light emitting surface 130a in a scattering pattern and coating a reflective film on the engraved light emitting surface 130a.

As a modification of the embodiment described with reference to FIG. 5, although not shown, the diffusion reflective member 138 may be formed by embossing the light emitting surface 130a in a scattering pattern and coating a reflective film on the embossed light emitting surface 130a.

Figure 6:
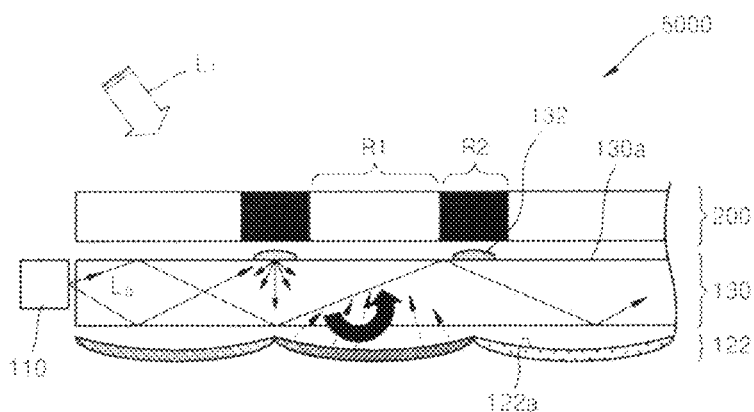

FIG. 6 is a cross-sectional diagram schematically illustrating a display apparatus 5000 according to example embodiments. Referring to FIG. 6, the display apparatus 5000 includes the light source 110, the light guide plate 130, a color reflective member 122, and the light modulation member 200. A diffusion reflective member 132 is disposed on the light emitting surface 130a of the light guide plate 130 and faces the ineffective region R2 of the light modulation member 200.

The display apparatus 5000 illustrated in FIG. 6 is different from the earlier described example display apparatuses in terms of the form of the color reflective member 122. Each color region 122a of the color reflective member 122 facing the light guide plate 130 may be formed to be concave toward the light guide plate 130, which narrows a scattering angle compared to a Lambertian scattering angle, reducing color cross talk, and increasing brightness.

Figure 7:
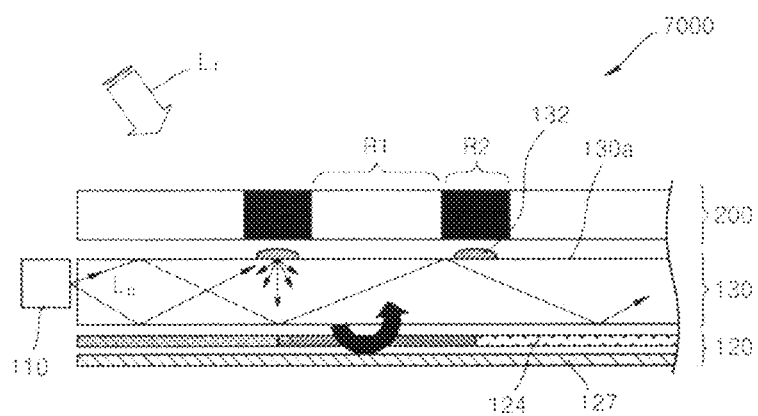

FIG. 7 is a cross-sectional diagram schematically illustrating a display apparatus 7000 according to example embodiments. Referring to FIG. 7, the example display apparatus 7000 includes the light source 110, the light guide plate 130, the color reflective member 120, and the light modulation member 200. The diffusion reflective member 132 is disposed in the light emitting surface 130a of the light guide plate 130 and faces the ineffective region R2 of the light modulation member 200. The color reflective member 120 includes a transmittive color filter 124 and a reflective plate 127 in the example display apparatus 7000 illustrated in FIG. 7, which is different from the previous described example display apparatuses. The transmittive color filter 124, for example, may be formed by regularly arranging red, green, and blue dyes on a transparent sheet.

Figure 8:
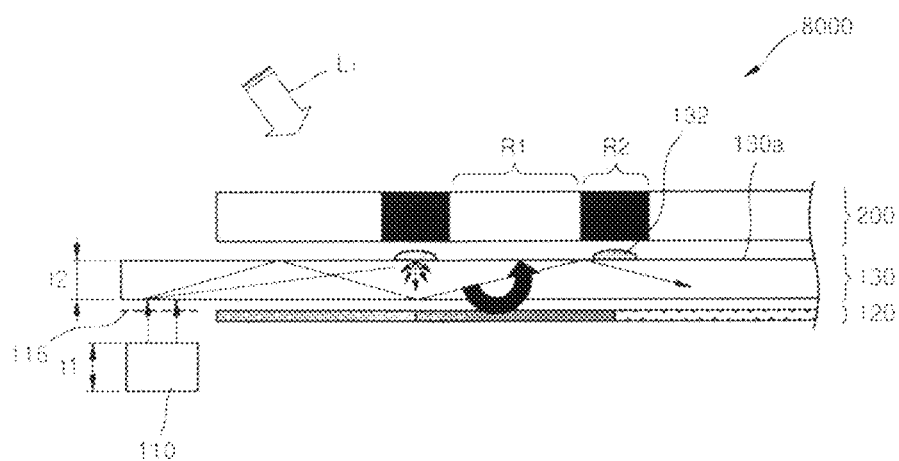

FIG. 8 is a cross-sectional diagram schematically illustrating a display apparatus 8000 according to example embodiments. Referring to FIG. 8, the example display apparatus 8000 includes the light source 110, a diffractive optical member 115, the light guide plate 130, the color reflective member 120, and the light modulation member 200. The diffusion reflective member 132 is disposed on the light emitting surface 130a of the light guide plate 130 and faces the ineffective region R2 of the light modulation member 200. The example display apparatus 8000 illustrated in FIG. 8 is different from the previous described example display apparatuses in terms of the structure of the display apparatus 8000 in which the light source 110 is disposed with regard to the light guide plate 130. That is, the light source 110 is disposed in one side lower portion of the light guide plate 130 and the diffractive optical member 115 is disposed between the light source 110 and the light guide plate 130 in order to reduce the thickness of the light guide plate 130. The diffractive optical member 115 may use a diffraction grating or hologram pattern designed to increase light efficiency of a diffraction degree. Light from the light source 110 may be incident onto the lower surface of the light guide plate 130 at a great incidence angle so that the diffractive optical member 115 moves the light toward the inside of the light guide plate 130. When the light source 110 is disposed in the side surface of the light guide plate 130, the thickness of the light guide plate 130 may be limited to the thickness of the light source 110, so that the thickness t2 of the light guide plate 130 may be smaller than the thickness t1 of the light source 110, and a light path may be formed in substantially the same manner as light is incident from the side surface of the light guide plate 130.

The differences between the example display apparatuses described with reference to FIGS. 3 through 8 and the example display apparatus described with reference to FIG. 1 are explained in terms of some of the elements. A method of forming an image by using the backlight Lb, and the external light Lf as image forming light is substantially the same as described in the example display apparatus with reference to FIG. 1. In addition to the embodiments described above, a display apparatus may be formed according to various combinations of the embodiments described above.

As described above, according to example embodiments, an example display apparatus may use light of an embedded light source and/or an external light as image forming light. In more detail, the external light may be used to form an image in the bright outdoors, an inside light is used to form the image in a dark place, and both the external light and inside light may be used to form the image in an environment of intermediate luminance, thereby forming an image having high visibility in any environment and reducing or minimizing the amount of energy consumed by the embedded light source.

While example embodiments have been particularly shown and described with reference to example embodiments thereof, it will be understood by those of ordinary skill in the art that various changes in form and details may be made therein without departing from the spirit and scope of the following claims.

What is claimed is:

1. A display apparatus comprising:
a light source configured to emit backlight;
a light guide plate configured to guide at least one of the backlight from the light source and external light between an upper surface of the light guide plate and a lower surface of the light guide plate, the upper surface of the light guide plate including a light emitting surface configured to emit at least one of the backlight from the light source and the external light;
a diffusion reflective member coated on the upper surface of the light guide plate, the diffusion reflective member configured to reflect the backlight;
a color reflective member below the lower surface of the light guide plate, the color reflective member including a plurality of arrayed color regions configured to receive at least one of the backlight and the external light and reflect at least one of the backlight and the external light as colored light to the light guide plate; and
a light modulation member above the upper surface of the light guide plate, the light modulation member including a plurality of pixel regions corresponding to the plurality of arrayed color regions, each of the plurality of pixel regions including an effective region and an ineffective region, the light modulation member being configured to modulate the colored light to form an image,
wherein the diffusion reflective member faces the ineffective regions, the diffusion reflective member includes a plurality of sub-diffusion reflective members, each of the sub-diffusion reflective members is configured to face a corresponding one of the ineffective regions, and an area of a sub-diffusion reflective member is equal to or smaller than an area of a corresponding ineffective region.

2. The apparatus of claim 1, wherein the area of a sub-diffusion reflective member facing a corresponding one of the ineffective regions varies as the sub-diffusion reflective member gets farther from the light source.

3. The apparatus of claim 2, wherein the area of sub-diffusion reflective member facing a corresponding one of the ineffective regions increases as the sub-diffusion reflective member gets farther from the light source.

4. The apparatus of claim 1, wherein a density of the sub-diffusion reflective members varies according to a distance between a respective one of the sub-diffusion reflective members and the light source.

5. The apparatus of claim 4, wherein the density of the sub-diffusion reflective members increases as a respective one of the sub-diffusion reflective members gets farther from the light source.

6. The apparatus of claim 1, wherein the diffusion reflective member includes a scattering material on the light emitting surface.

7. The apparatus of claim 1, wherein the diffusion reflective member includes a scattering material having a florescent material.

8. The apparatus of claim 7, wherein the light source is one of a blue light emitting diode and an ultraviolet ray light emitting diode.

9. The apparatus of claim 1, wherein the color reflective member includes a reflective color filter.

10. The apparatus of claim 1, wherein the color reflective member includes a photonic crystal color filter.

11. The apparatus of claim 1, wherein the color reflective member includes a transmittive color filter and the reflective film.

12. The apparatus of claim 1, wherein each color region of the color reflective member facing the light guide plate is concave toward the light guide plate.

13. The apparatus of claim 1, further comprising:
a diffractive optical member between the light source and the light guide plate, wherein the light source is below the light guide plate.

14. The apparatus of claim 13, wherein a thickness of the light guide plate is smaller than a thickness of the light source.

15. The apparatus of any one of claim 1, wherein the light modulation member is one of a liquid crystal panel, a polymer dispersed liquid crystal (PDLC) panel, an electrochromic display panel, an electro-wetting display panel, an electrophoretic display panel, and a micro electro mechanical system (MEMS) shutter.

16. The apparatus of claim 1, wherein the diffusion reflective member includes a plurality of scattering material patterns.

17. The apparatus of claim 16, wherein each of the plurality of scattering material patterns correspond to a respective ineffective region of the light modulation member and an area of each of the plurality of scattering material patterns is smaller than an area of the corresponding respective ineffective region.

* * * * *